H. L. HAPPER.
ROASTER.
APPLICATION FILED JULY 9, 1915.

1,245,710.

Patented Nov. 6, 1917.

WITNESSES

INVENTOR
HERVEY L. HAPPER
BY
ATTORNEYS

UNITED STATES PATENT OFFICE.

HERVEY L. HAPPER, OF MILWAUKEE, WISCONSIN.

ROASTER.

1,245,710. Specification of Letters Patent. Patented Nov. 6, 1917.

Application filed July 9, 1915. Serial No. 38,885.

*To all whom it may concern:*

Be it known that I, HERVEY L. HAPPER, citizen of the United States, resident of Milwaukee, county of Milwaukee, State of Wisconsin, have invented certain new and useful Improvements in Roasters, of which the following is a specification.

The object of my invention is to provide improved means for supporting articles of food, such as bacon, in the upper part of a roaster and where the drippings will fall down upon the meat in the pan beneath.

A further object is to improve the device shown and described in my pending application for Letters Patent of the United States, Serial No. 870,594, dated November 6, 1914.

The invention consists generally in various constructions and combinations, all as hereinafter described and particularly pointed out in the claims.

Figure 1:
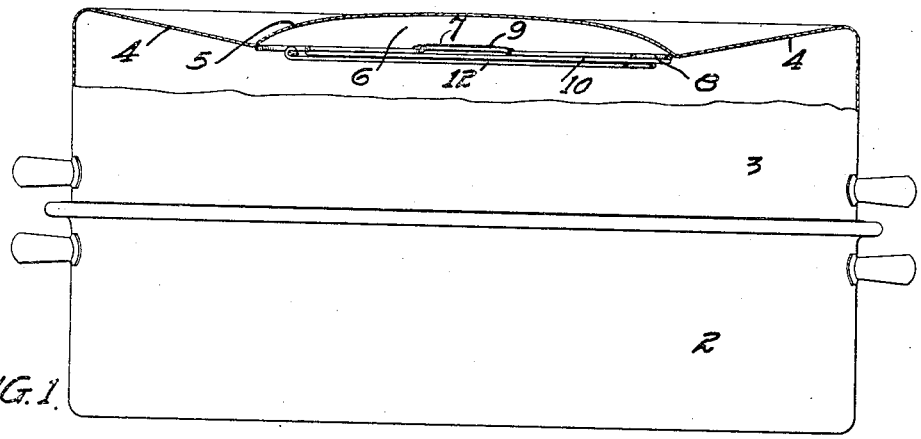
Figure 2:
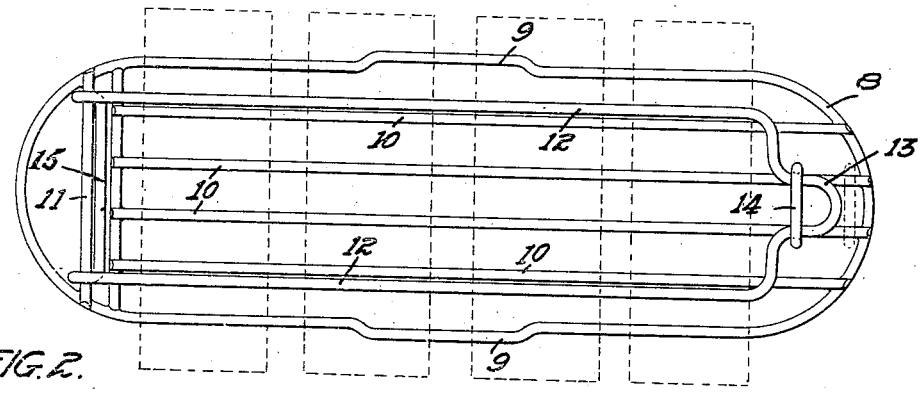
Figure 3:
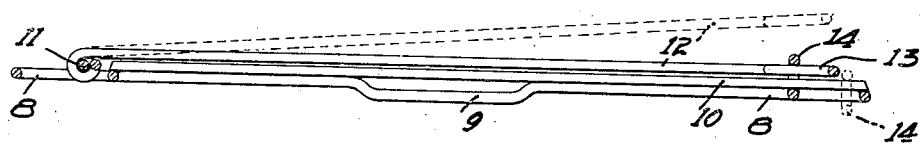
Figures 4, 5:
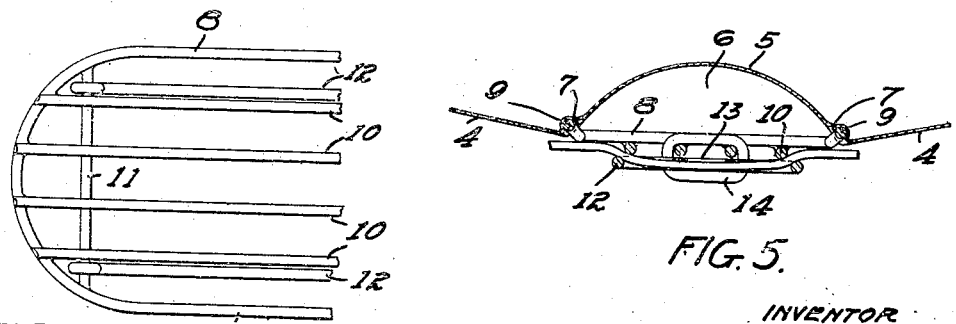

In the accompanying drawings forming part of this specification,

Figure 1 is a sectional view through a roaster with my invention applied thereto, Fig. 2 is a plan view of the attachment removed from the roaster, Fig. 3 is an edge view, in section, Fig. 4 is a detail view of one end of the attachment, showing a modified construction, Fig. 5 is a transverse sectional view through the cover or upper portion of the roaster, showing the preferred manner of mounting the attachment therein.

In the drawing, 2 represents the base or lower portion of the roaster and 3 the top or cover, having an upper wall 4 that is made concave for the purpose of directing the condensation of the steam from the cooking food inwardly toward the middle portion of the roaster. A dome 5 is centrally located in the upper wall of the cover, extending preferably lengthwise thereof over the middle portion of the roaster, as shown plainly in Fig. 1. This dome forms an elongated, comparatively narrow chamber 6 in the cover. The walls of this dome are preferably provided with recesses 7 pressed or punched outwardly therein on each side of the dome. 8 represents a grate or griddle, oval, preferably, in form, conforming substantially to the shape of the dome 5, and constituting a support for strips of bacon, or other basting-means. The outer rails of this grate are preferably provided with projecting portions 9, said rails being formed of suitable spring material, and the projections 9 being adapted to snap into the recesses 7 and lock the grate securely in position beneath the chamber 6. Bars 10 are mounted lengthwise of the grate and a cross bar 11 is provided at one end whereon a member 12 is hinged. This member is preferably composed of wire having parallel side rails and a loop 13 formed in its end opposite the hinged end thereof, said loop corresponding preferably in width to the distance across two adjacent bars 10, and a link 14 is mounted to slide on these bars and receive the end of the loop 13, thereby locking the two portions of the bar together and securing the strips of bacon or other articles of food between them.

The hinge of the member 12, as shown in Fig. 2, is preferably formed by bending the side bars downwardly, as shown at 15, under the cross bar 11, this being a convenient means for attaching the upper and lower sections of the grate together.

In Fig. 4 I have shown a modification which consists in extending the bars 10 through to the end of the grate and then forming loops in the side rails of the member 12, said loops being bent around the cross bar to form a hinge connection between the upper and lower portions of the grate.

By making this attachment of sections hinged together, I can place articles of food, such as bacon, therein or remove them without detaching the grate from the cover, and whenever desired the entire device may be removed by simply pressing inwardly on the side rails of the grate.

The device may be made in various sizes and the gage of wire used may be varied as may seem advisable. The details of construction and the manner of connecting the parts may be modified and still be within the scope of my invention.

I claim as my invention:

1. A roaster comprising a cover having a dome formed therein, the cover at the base of the dome having recesses therein, and a support for articles of food positioned across the base of the dome, said support having projections at its sides adapted to fit in the recesses of the cover.

2. A roaster comprising a cover having a dome formed therein and at the base of the dome formed with recesses, and a support for articles of food positioned across the base of the dome, the sides of said support being resilient and adapted to have a part thereof fit in said recesses to sustain the support in place.

3. A roaster comprising a cover having a dome formed therein and a support for articles of food having yielding side rails and projections thereon adapted to fit recesses formed in the walls of said dome.

4. A roaster having a cover and a dome formed thereon and a support comprising two members hinged together, one of said members having projections adapted to fit into recesses provided in said cover and supported thereby.

5. A roaster having a cover, a grated basting-means support disposed centrally of the under face of the cover and attached to the cover to be removed therewith and composed of upper and lower members hinged together at one end, and means for detachably securing the opposite ends of said members together, said support being of relatively smaller area than the cover to which attached.

6. A roaster cover having a concave top provided with a convex, comparatively narrow middle portion forming a dome in the middle of the cover, a grate having side rails of spring material fitting the top of said cover beneath said concave portion, said cover having means engaging with said rails for supporting said grate, said grate being composed of upper and lower members, hinged together.

7. An attachment for a roaster comprising a grate having side rails and bars upon which articles of food, such as bacon, are placed, means for supporting said grate in relatively close relation to the under face of a cover, means for securing the articles of food to the grate consisting of a section hinged to the grate, and a locking device for said hinged section, the grate being of relatively smaller area than the cover to which it is attached.

In witness whereof I have hereunto set my hand this 21st day of June, 1915.

HERVEY L. HAPPER.

Copies of this patent may be obtained for five cents each, by addressing the "Commissioner of Patents, Washington, D. C."